Figure 1:
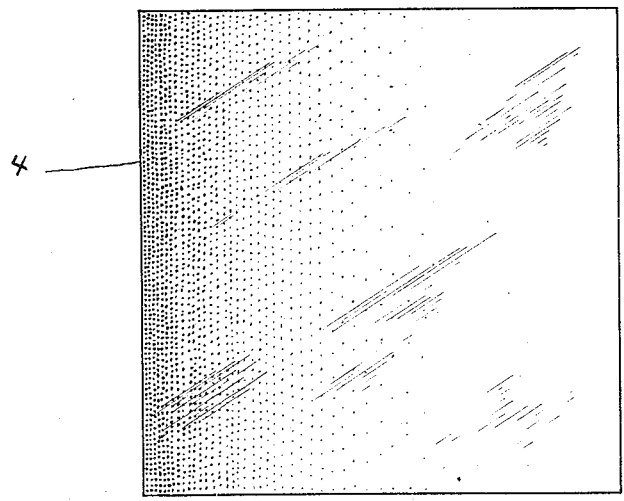

May 19, 1931.  C. G. BOSTRÖM  1,805,969
PROTECTIVE GLASS WITH COLOR WEDGE FOR SPECTACLES TOGETHER
WITH METHOD FOR MANUFACTURING SAME
Filed Aug. 28, 1928

Inventor
C. G. Boström
By his Attorneys
Ruege, Boyce & Baleelar

Patented May 19, 1931

1,805,969

UNITED STATES PATENT OFFICE

CARL GUSTAF BOSTRÖM, OF STOCKHOLM, SWEDEN

PROTECTIVE GLASS WITH COLOR WEDGE FOR SPECTACLES TOGETHER WITH METHODS FOR MANUFACTURING SAME

Application filed August 28, 1928, Serial No. 302,646, and in Sweden July 21, 1928.

This invention relates to improvements in glass plates for spectacle lenses and methods of producing said plates, the principal object of the invention being to provide a glass plate from which a spectacle lens may be manufactured, said plate having incorporated therein a wedge of color for the protection of the eyes of the user of the spectacles, which wedge is comparatively dense at one end thereof and fades gradually into transparency toward its opposite end.

For the manufacture of protective glass with a color wedge for spactacles there has previously been suggested and also used in practice the method of melting together with each other a colored and an uncolored mass of glass and afterwards possibly grinding the glasses thus homogeneously united in such a way as to obtain a glass in which while retaining a certain thickness in the glass, the colored portion gradually decreases in thickness from a certain part of the edge and the uncolored portion gradually increases in thickness from the same part of the edge. Such protective glass is manufactured for instance by the German firm of Zeiss under the name of "Umbralgläser mit Farbkeil". The protective glasses are intended to be used by those persons who on certain occasions are sometimes in need of protecting their eyes against too strong light and sometimes to see more distinctly by alternately directing their glance through a thicker or thinner colored portion or through an entirely uncolored portion. These protective glasses are nevertheless rather expensive to manufacture and possess some other drawbacks which have been eliminated by the present invention.

According to the present invention the color wedge is disposed in a layer of a compound of resin and other substances placed between two uncolored glass plates, which compound possesses approximately the same transparency and refractory index as the glass and forms a cement or putty for uniting the glasses into an entity, said cement being capable of resisting atmospheric and temperature changes, to which the protective glasses may be exposed in use. No grinding of the glass for obtaining the color wedge is thus necessary, and the manufacture consequently is remarkably cheap. Another advantage possessed by the invention consists in the fact that the glasses may be ground in the same manner as ordinary corrective glasses in order to adapt them to different errors of light refraction, e. g. myopia, presbyopia, astigmatism, etc. In the known glasses provided with a color wedge this is impossible without spoiling or destroying the color wedge. In the present invention it is therefore possible to obviate the drawback of being forced in such errors of light refraction to make use of ordinary spectacles in addition to a protective glass with color wedge, which is stated to be necessary by the manufacturer of the umbral glasses hereinbefore referred to. Furthermore, the risk of splinters loosening in case of damage to the protective glasses and injuring the eyes of the person using such protective glasses, is not so great with the present invention as in the case of the said previously known protective glasses, as in the former the putty or cement contributes towards preventing the loosening of such splinters.

In the drawings accompanying this specification

Fig. 1 is a plan; and

Figure 2:
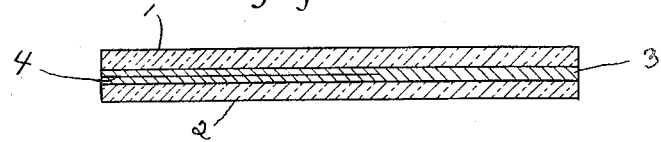

Fig. 2 a sectional side view of a glass plate embodying the features of the invention, the thickness of the cement layer being exaggerated for clarity of illustration. In the drawings, 1 and 2 designate two glass plates cemented together by means of an intermediate layer 3 of a colorless resin or other compound having, as hereinbefore stated, approximately the same transparency and refractory index as the glass, and incorporated in which intermediate layer is what I have termed herein a color wedge 4. The composite plate is produced by first applying a layer of the colorless cement compound 3 to one surface of one of the glass plates, then depositing, by spraying or otherwise, the color wedge on said cement layer, the color being applied so as to be comparatively dense at one end and gradually fading into transparency as it approaches the opposite end. A second glass plate on which a similar layer of the transparent cement has been applied is then superimposed on the surface of the first layer with the cement layers in mutual contact. The two glass plates are thus firmly cemented together and form a lens blank in which is incorporated a color wedge having the proper degree of density fading into transparency as it traverses the surface of the lens, without the necessity of changing the shape of the composite plate or of the layers of material of which it is made. The proper degree of toning down may be obtained by spraying the color on in a direction at an oblique angle to the plates.

This may be accomplished by supporting the glass on one of its edges in an inclined position and using a sprayer to spray on the color. By reciprocating the sprayer horizontally and parallel with the lower edge of the glass, the color may be applied until sufficient color has been sprayed at the lower edge. The sprayer is then raised slightly and again reciprocated horizontally, and so on. It will readily be seen that by reducing the number of reciprocations of the sprayer as the latter is raised, the required toning down or fading of the color from the lower edge of the glass upwards may be effected. By spraying the color on to that side of the glass plate which forms an acute angle with the horizontal, the color is not apt to be sprinkled above the horizontal plane of the sprayer, which would, of course, be a disadvantage. If it should be desired to spray the color on the glass so that the wedge will have the form of an annulus comparatively dense at its outer edge and gradually fading into transparency toward its inner edge, the sprayer, instead of being moved horizontally, may be held stationary while the glass is rotated, and after each complete rotation the sprayer may be slightly raised as hereinbefore stated and the glass plate again rotated, this operation being continued until the required density of color has been obtained at each successive rotation.

The material used as a coloring agent is dark blue or dark brown, light and heat proof aniline colors, such as oxazines, and the vehicle or solvent used to form a spray is preferably benzole.

If necessary each glass may beforehand be ground on its outer side for the correction of any of the aforesaid errors of light refraction. It has been found that with a suitable selection of the component materials of the aforesaid first compound and their combination in proper proportions, the layer forms a net work the meshes of which cause the adhesion of the layer or film to the glass coated or covered with the same, while the coloring matter used is absorbed between the meshes. For the color wedge a color is preferably selected which possesses the quality of approximately uniformly reducing the intensity of all colors without altering the quality of the colors.

What I claim is:—

1. An article of manufacture, comprising a pair of glass plates secured together by a colorless cement compound of uniform thickness and possessing approximately the same transparency and refractory index as the glass plates, and a color wedge embedded in said compound, said color wedge being comparatively dense at one end and gradually fading into transparency toward its opposite end.

2. The method of producing a glass for spectacles, which consists in applying to a plate of glass a layer of a colorless cement compound, applying to said layer a color fading from comparative density at one end of the plate to transparency toward the other end of said plate, applying to a second glass plate a similar layer of colorless cement compound, and superimposing said glass plates on each other with their cement layers in mutual contact.

In testimony whereof I have signed my name to this specification.

CARL GUSTAF BOSTRÖM.